US012559010B2

(12) United States Patent (10) Patent No.: US 12,559,010 B2
Knox, Jr. et al. (45) Date of Patent: Feb. 24, 2026

(54) HEADREST SPEAKER WITH OVER-MOLDED ACOUSTIC CHANNEL

(71) Applicant: Bose Corporation, Framingham, MA (US)

(72) Inventors: Robert James Knox, Jr., Northborough, MA (US); Bradford Kyle Subat, Northborough, MA (US)

(73) Assignee: Bose Corporation, Framingham, MA (US)

( * ) Notice: Subject to any disclaimer, the term of this patent is extended or adjusted under 35 U.S.C. 154(b) by 173 days.

(21) Appl. No.: 18/381,714

(22) Filed: Oct. 19, 2023

(65) Prior Publication Data

US 2025/0128652 A1     Apr. 24, 2025

(51) Int. Cl.
*B60N 2/879*     (2018.01)
*H04R 1/02*     (2006.01)

(52) U.S. Cl.
CPC ............. *B60N 2/879* (2018.02); *H04R 1/023* (2013.01); *H04R 1/025* (2013.01); *H04R 2499/13* (2013.01)

(58) Field of Classification Search
CPC ........ B60N 2/879; H04R 1/023; H04R 1/025; H04R 2499/13

USPC ......................................................... 381/86
See application file for complete search history.

(56) References Cited

U.S. PATENT DOCUMENTS

| | | | |
|---|---|---|---|
| 11,110,839 | B2 | 9/2021 | Subat et al. |
| 11,336,976 | B2 | 5/2022 | Subat |
| 2021/0074258 | A1 | 3/2021 | Konno et al. |
| 2023/0033250 | A1 | 2/2023 | Bösl et al. |

FOREIGN PATENT DOCUMENTS

| | | |
|---|---|---|
| EP | 0692563 A1 | 1/1996 |
| EP | 3100904 A1 | 12/2016 |
| EP | 3257402 A1 | 12/2017 |

OTHER PUBLICATIONS

PCT International Search Report and Written Opinion for International Application No. PCT/US2024/050520, dated Jan. 31, 2025, 8 pages.

*Primary Examiner* — Sean H Nguyen
(74) *Attorney, Agent, or Firm* — Hoffman Warnick LLC

(57) ABSTRACT

Various implementations include headrest speakers and approaches for forming such headrest speakers. In certain implementations, a headrest speaker includes: an acoustic channel; a three-dimensional (3D) acoustically transparent mesh in the acoustic channel; and a foam retaining the acoustically transparent mesh in the acoustic channel.

23 Claims, 9 Drawing Sheets

FIG. 7

HEADREST SPEAKER WITH OVER-MOLDED ACOUSTIC CHANNEL

TECHNICAL FIELD

This disclosure generally relates to headrests and related speakers. More particularly, the disclosure relates to acoustic channels in headrest speakers.

BACKGROUND

Headrest speakers, for example, in chairs or seats, can provide significant acoustic benefits. For example, in an automobile sound system, headrest speakers can enhance the immersive audio experience. Such headrest speakers can be used to improve inter-seat isolation, surround effects, and/or aid in controlling the center image of audio output for users. However, certain conventional headrest speakers make seating uncomfortable for users, are unsightly, and/or are costly.

SUMMARY

All examples and features mentioned below can be combined in any technically possible way.

Various implementations include headrest speakers and approaches for forming such headrest speakers. In certain implementations, a headrest speaker includes: an acoustic channel; a three-dimensional (3D) acoustically transparent mesh in the acoustic channel; and a foam retaining the acoustically transparent mesh in the acoustic channel.

Additional implementations include method of manufacturing a headrest speaker including: defining the acoustic channel in the 3D acoustically transparent mesh; placing the 3D acoustically transparent mesh in a mold; and bonding the foam around the 3D acoustically transparent mesh in the mold.

Implementations may include one of the following features, or any combination thereof.

In certain aspects, the foam is over-molded on the 3D acoustically transparent mesh.

In particular implementations, the 3D acoustically transparent mesh defines a portion of the acoustic channel extending through the foam.

In certain cases, the 3D acoustically transparent mesh is pinched at an interface with the foam in the acoustic channel.

In some aspects, the 3D acoustically transparent mesh has a uniform thickness across the acoustic channel.

In some aspects, a front face of the 3D acoustically transparent mesh is approximately flush with a front face of the foam.

In some aspects, a rear face of the 3D acoustically transparent mesh is recessed relative to a rear face of the foam.

In some aspects, the 3D acoustically transparent mesh is entirely retained in the headrest speaker by the foam.

In some aspects, the 3D acoustically transparent mesh has a thickness of approximately 15 millimeters (mm) to approximately 35 mm. In particular examples, the 3D acoustically transparent mesh has a thickness of approximately 25 mm.

In some aspects, the foam is approximately 20 mm thick to approximately 50 mm thick. In particular examples, the foam is nominally thicker than the 3D acoustically transparent mesh.

In some aspects, the headrest speaker further includes a fabric (cover) covering the foam.

In some aspects, the foam is acoustically opaque.

In some aspects, the foam includes at least one of a foam-in place material or a urethane. In particular examples, the foam includes a two-part foam. In further examples, the foam includes an energy management polyurethane foam.

In some aspects, the 3D acoustically transparent mesh includes a spacer fabric.

In some aspects, the spacer fabric includes: a first outer fabric layer, a second outer fabric layer, and a layer of pile threads connecting the first outer fabric layer and the second outer fabric layer.

In some aspects, the layer of pile threads separates the first outer fabric layer from the second outer fabric layer, and the spacer fabric has greater mechanical resistance against compression in a first direction than against compression in a second, distinct direction.

In some aspects, the headrest speaker is one of a pair of headrest speakers on either side of a centerline of the headrest, and a center-to-center spacing between the pair of headrest speakers is between approximately 150 millimeters and approximately 300 mm. In some examples, the center-to-center spacing is approximately 200 mm.

In some aspects, the acoustic channel has one of a forward firing angle relative to a front face of the headrest or an inward firing angle relative to a front face of the headrest.

In some aspects, the 3D acoustically transparent mesh provides structural support for the acoustic channel to resist puncture at an exit of the acoustic channel. In certain examples, the headrest speaker does not include a grille along a front surface thereof.

In some aspects, the acoustic channel is defined in the 3D acoustically transparent mesh by cutting, and the foam is bonded to the 3D acoustically transparent mesh while maintaining the acoustic channel.

In some aspects, a vehicle seat includes the headrest speaker. In certain aspects, a vehicle includes the vehicle seat.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

BRIEF DESCRIPTION OF THE DRAWINGS

FIG. 7 shows front and back views of an acoustic mesh over-molded in foam according to various implementations.

Figure 1:
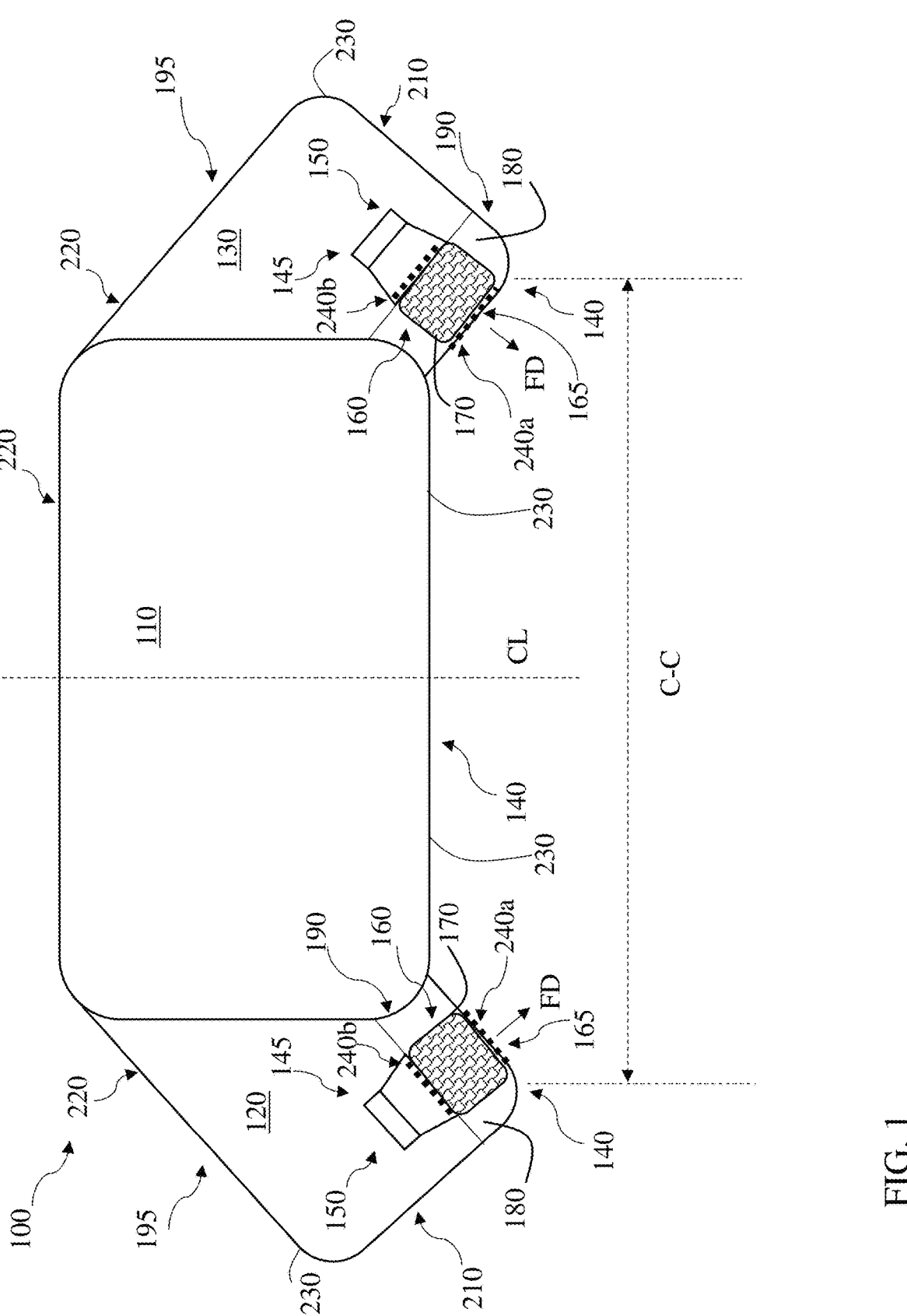
FIG. 1 is a schematic top cut-away view of an example headrest according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that headrest foam can be formed around an acoustic channel to produce a low-profile headrest speaker. In certain cases, foam is formed on a three-dimensional (3D) acoustically transparent mesh to create an acoustic channel for a headrest speaker. In various implementations, the 3D acoustically transparent mesh is stiff enough to resist pressure such as a user's grip on the headrest while maintaining the acoustic channel shape. In various examples, the headrest speaker can be formed without a front grille, reducing the profile of the speaker components relative to the front of the headrest. When compared with conventional approaches, the headrests, seats and approaches disclosed herein can improve the user experience, enhance esthetics, and/or reduce manufacturing costs.

Commonly labeled components in the FIGURES are considered to be substantially equivalent components for the purposes of illustration, and redundant discussion of those components is omitted for clarity. Various aspects of headrest speakers and related materials are described herein, certain of which are included in U.S. Pat. Nos. 11,336,976, 11,110,839, and European Patent No. EP 0692563, the entire contents of each of which is incorporated by reference herein.

FIG. 1 is a schematic partial cut-away top view of a headrest 100 according to various implementations. In certain cases, the headrest 100 is part of a vehicle headrest, such as an automobile headrest, public transit vehicle headrest, or aircraft headrest. In further implementations, the headrest 100 is part of a seat such as a gaming seat, a home entertainment seat, or an office seat. The headrest 100 can include a main body portion 110 for supporting the back of a user's head. In some cases, the main body portion 110 is supported by one or more support rods (not shown) that couple the main body 110 with a seat back. In other cases, the main body portion 110 is integrated into a seat back portion, such as in a "mummy"-style seat. Side sections 120, 130 can extend from the main body 110, and in some cases, extend laterally relative to the user's head. In certain cases, side sections 120, 130 are integral with the main body 110, such that a front surface 140 of the headrest 100 has little or no visible seam between the side sections 120, 130 and the main body 110. In further implementations, the side sections 120, 130 are delineated relative to the main body 110. In various implementations, side sections 120, 130 are optional.

Figure 2:
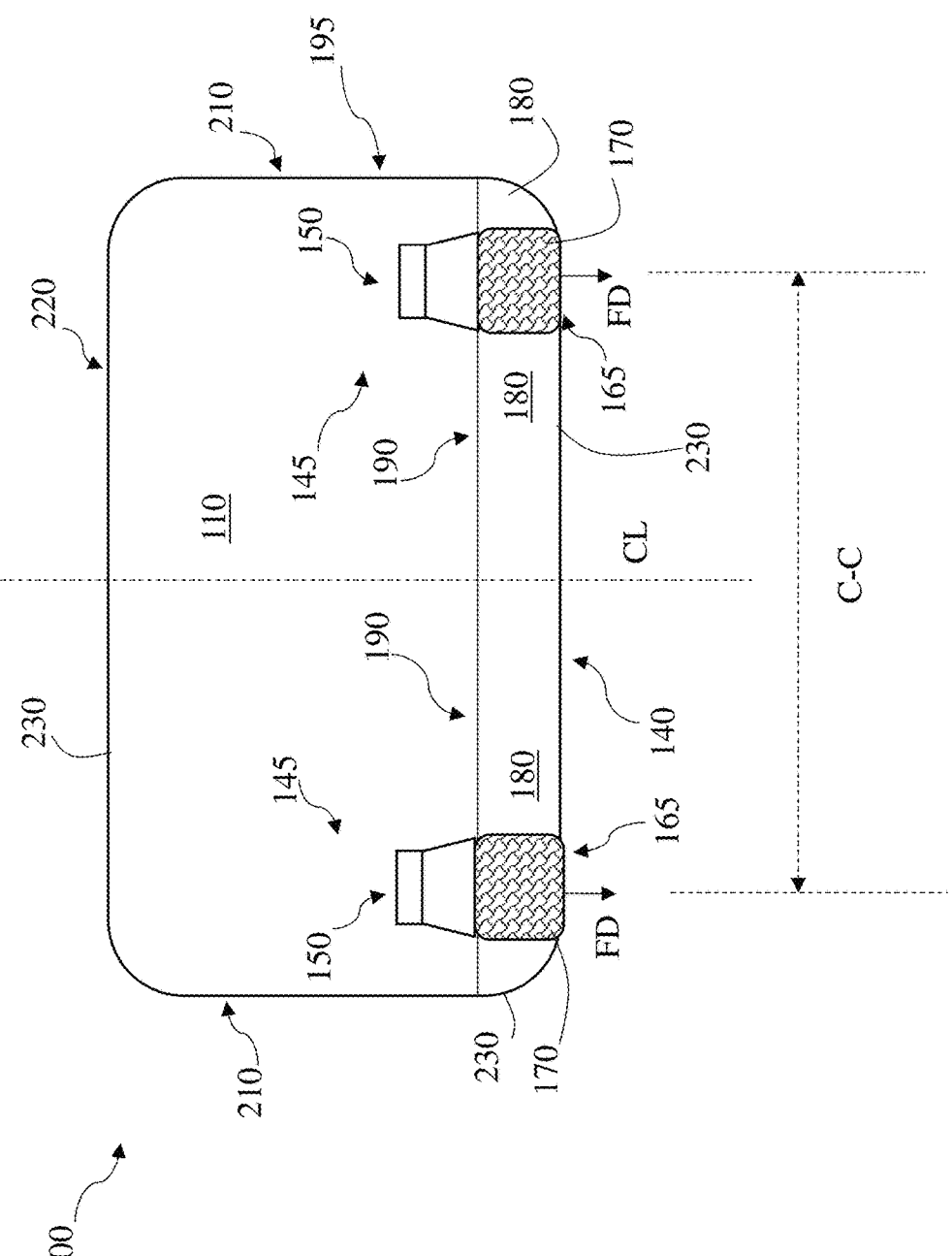
FIG. 2 is a schematic top cut-away view of an example headrest according to various additional implementations.

Aspects of electronics in the core assembly of the main body 110 are described, for example, in U.S. Pat. No. 11,336,976 (previously incorporated by reference herein). In various implementations, in assembled form, the headrest 100 includes a set of headrest speakers 145. In certain cases, headrest speakers 145 can include transducers (e.g., electro-acoustic transducers) 150 for providing an audio output to a user. Mounting of transducers 150 and related electronics is omitted, but can be found, for example, in U.S. Pat. No. 11,336,976 (previously incorporated by reference herein). In certain cases, the transducers 150 are forward or inward firing, e.g., having a firing direction (FD) that is either parallel to a line (CL) extending through the center of the headrest or intersects line CL. FIG. 2 shows another implementation of a headrest 200 with headrest speakers 145 that include forward firing transducers 150 mounted in the main body 110, e.g., without side sections 120, 130. However, various additional configurations of headrest shape are compatible with the disclosed implementations.

Returning to FIG. 1 (with continuing reference to FIG. 2), the headrest 100 including speakers 145 can further include an acoustic channel 160 for enabling acoustic output from the transducer 150 to reach the user. In various implementations, the acoustic channel 160 is filled or nearly filled with a three-dimensional (3D) acoustically transparent mesh 170. The 3D acoustically transparent mesh (or, mesh) 170 is retained in the acoustic channel 160 by a foam 180. In certain implementations, the foam 180 and the mesh 170 are part of a front cushion 190 of the headrest 100, e.g., that is connected with a back 195 of the headrest main body 110 or sides 120, 130. In particular cases, the front cushion 190 can be coupled with the back 195 of the headrest main body 110 or sides 120, 130 via one or more fasteners, snap-fit or pressure-fit couplings, screws, bolts, etc. In various implementations, the front cushion 190 is formed in a complex three-dimensional shape that is fit over a portion of the back 195 of the headrest. In certain cases, the foam 180 of the front cushion 190 fits around a portion of the back 195 of the headrest (e.g., the housing of the transducer 150) in a clamshell-type fit.

In various implementations, the front surface 140 extends over the sides 120, 130 of the headrest 100. Further, side surfaces 210 and rear surface(s) 220 are illustrated in FIG. 1. It is understood that various shapes of headrest 100 may have distinct configurations of front, rear, and side surfaces, e.g., as shown in FIG. 2. In particular examples, the front surface(s) are those facing (or directed toward) the user's head in the seated position. As illustrated in FIGS. 1 and 2, a cover 230 can cover the headrest 110, including foam 180. In particular cases, one or more pieces of a cover 230 can wrap the headrest 110, e.g., over the front surface 140. In certain examples, cover 230 can wrap around the headrest 100 including the front surface 140 and one or more of the side surfaces 210 and rear surface(s) 220. In various implementations, cover 230 includes a fabric or pliable cover, e.g., a cloth, leather, synthetic, etc. The cover 230 is mounted under tension to aid in retention of the front cushion 190, along with enhancing aesthetic appeal.

While various implementations are described as enabling a headrest without a grille overlying the channel 160, in certain implementations, a grille 240a (FIG. 1) is positioned over the mesh 170 in the channel 160, for example, under the cover 230 or as part of the cover 230. Grille 240a is illustrated in dashed lines as optional, and is not necessarily present in various disclosed implementations. In cases where grille 240a is present, additional implementations can enable retaining the grille 240a in the headrest with the foam 180, e.g., by over-molding with the mesh 170.

Figure 3:
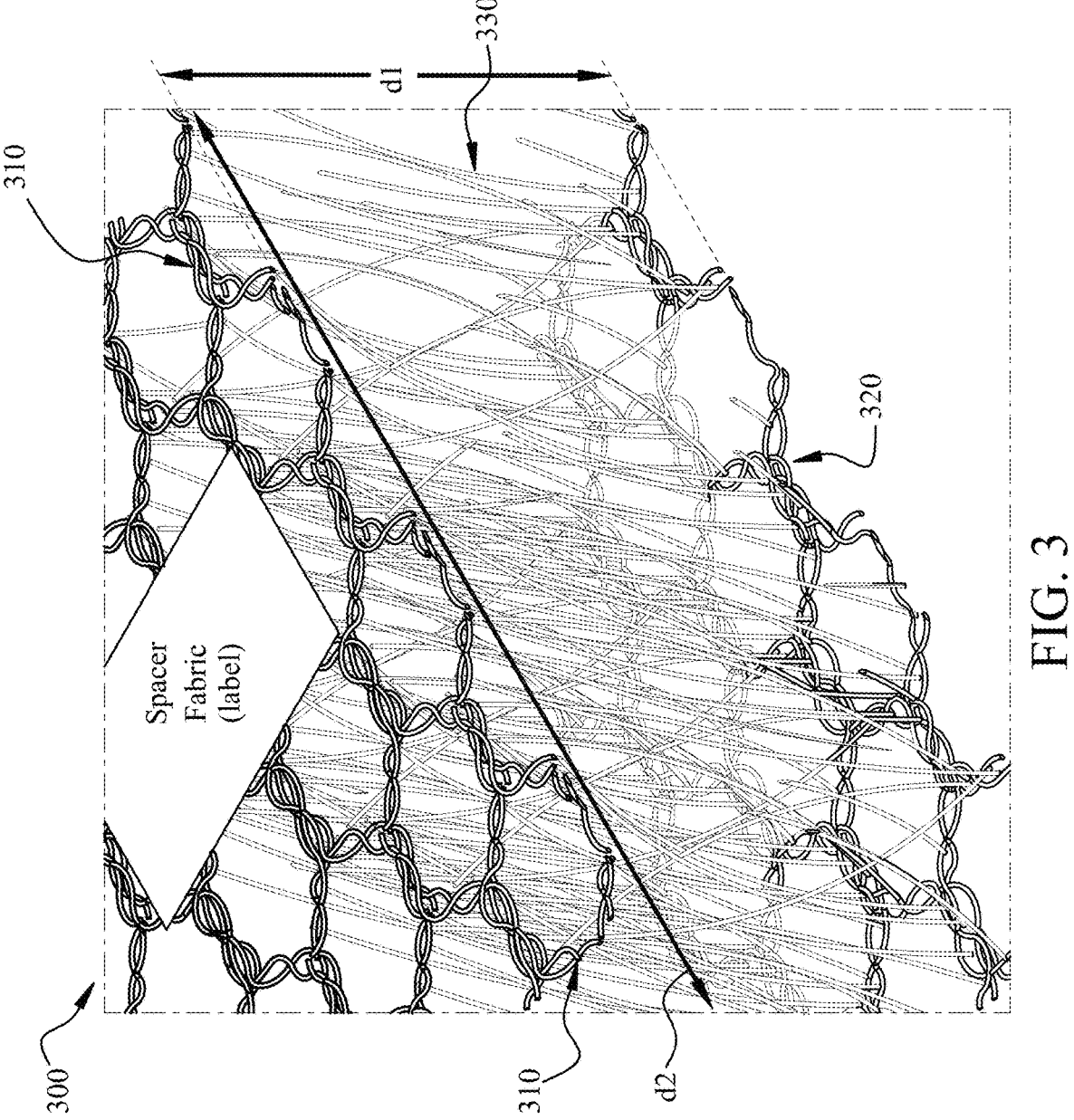
FIG. 3 is a perspective view of example spacer fabric according to various implementations.

In some cases, the mesh 170 includes a spacer fabric such as those described in EP U.S. Pat. No. 692,563 (previously incorporated by reference herein). FIG. 3 is a picture of an example spacer fabric 300 that can be used as the mesh 170 according to various implementations. In some aspects, the spacer fabric 300 includes: a first outer fabric layer 310, a second outer fabric layer 320 (opposing first outer fabric layer 310), and a layer of pile threads 330 connecting the first outer fabric layer 310 and the second outer fabric layer 320. In some aspects, the layer of pile threads 330 separates the first outer fabric layer 310 from the second outer fabric layer 320. In various implementations, the spacer fabric 300 has greater mechanical resistance against compression in a first direction (d1) than against compression in a second, distinct direction (d2). In certain cases, d2 is perpendicular to d1. In various implementations, the mesh 170 includes spacer fabric 300, and is oriented in the acoustic channel 160 such that the firing direction (FD) is aligned with the first direction (d1). In certain examples, the mesh 170 has a thickness of approximately 15 millimeters (mm) to approximately 35 mm, as measured in a direction parallel to the acoustic channel 160 (i.e., in the firing direction FD). In more particular cases, the mesh 170 has a thickness of approximately 25 mm.

Returning to FIGS. 1 and 2, in certain cases, the foam 180 includes at least one of a foam-in place material or a urethane. In particular examples, the foam includes a two-part foam. In further examples, the foam 180 includes an energy management polyurethane foam. According to various implementations, the foam 180 is acoustically opaque. In some examples, the foam is approximately 20 mm thick to approximately 50 mm thick, as measured in a direction parallel to FD. In certain aspects, the foam 180 is nominally thicker than the mesh 170.

Figure 4:
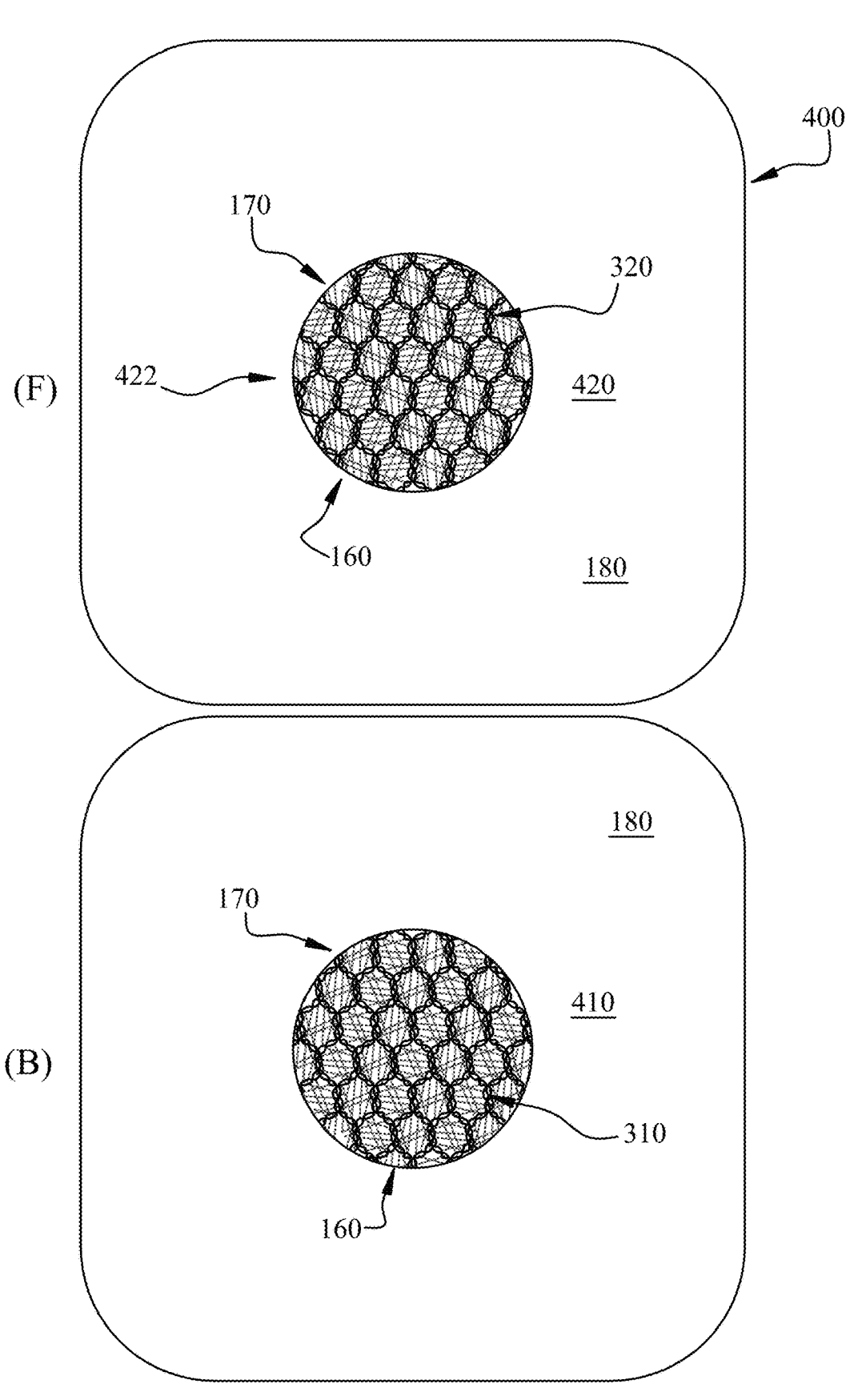
FIG. 4 shows front and back views of an acoustic mesh over-molded in foam according to various implementations.
Figures 5, 6:
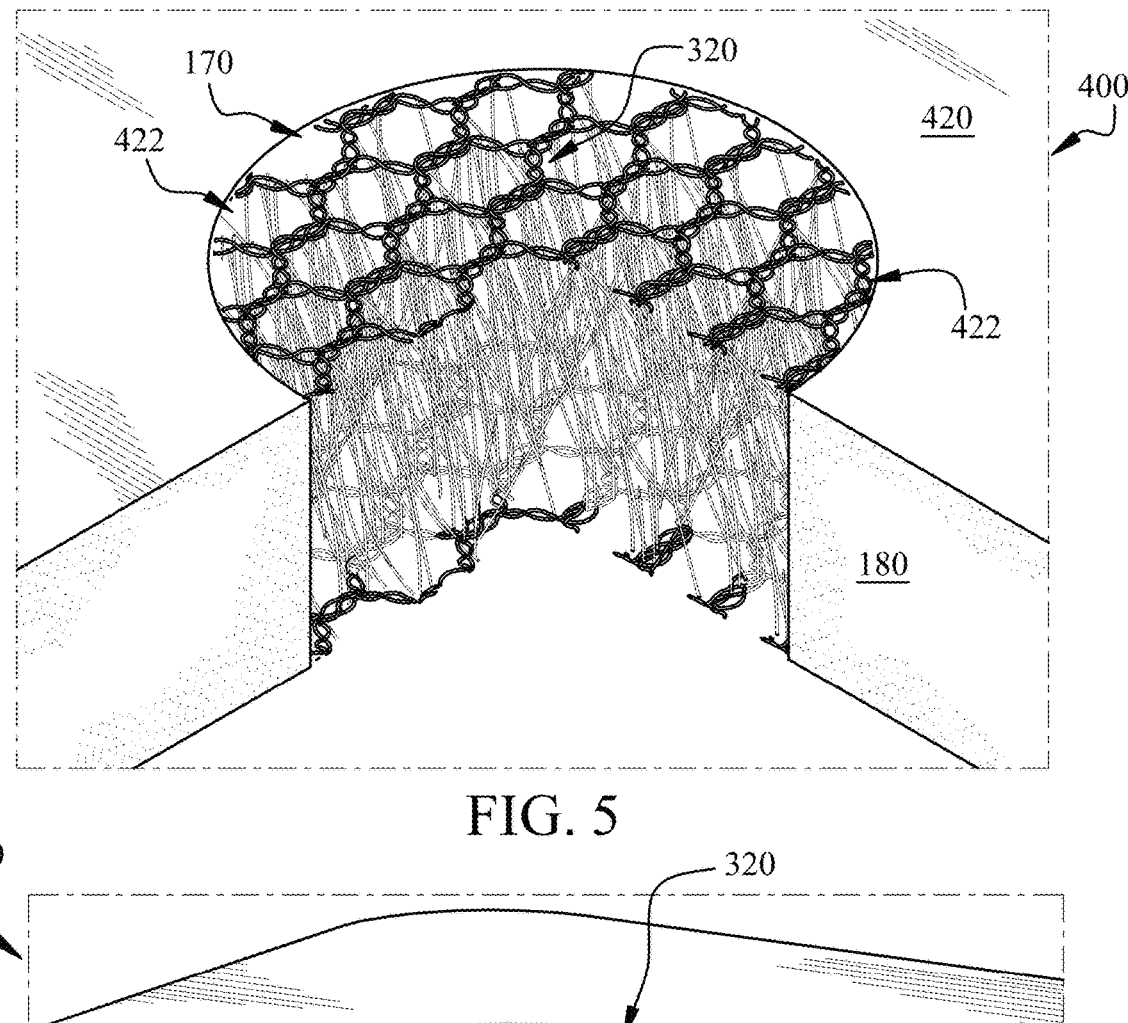
FIG. 5 shows a perspective view of the mesh and foam configuration in FIG. 4.
FIG. 6 shows a cross-sectional view of the mesh and foam configuration in FIG. 5.

FIGS. 4-6 illustrate a first configuration 400 of foam 180 formed on mesh 170. FIG. 4 shows front (F) and back (B) orientations of the foam 180 on mesh 170, respectively, FIG. 5 shows a perspective cut-away view of the foam 180 on mesh 170, and FIG. 6 shows a partial cross-section of the foam 180 on mesh 170 in FIG. 5. In these examples, the foam 180 is over-molded on mesh 170. According to various implementations, the mesh 170 defines a portion of the acoustic channel 160 extending through the foam 180. That is, because the foam 180 is acoustically opaque and the mesh 170 is acoustically transparent, the foam 180 can be over-molded on the mesh 170 to define the acoustic channel 160 through which output from the transducer 150 can pass. As described herein, in various implementations the mesh 170 is entirely retained in the headrest 100 by the foam 180. In certain of these cases, the mesh 170 only contacts the foam 180 within the headrest 100.

In the first configuration 400 (FIGS. 4-6), the foam 180 is over-molded on mesh 170 such that a first outer fabric layer 310 of the mesh 170 is over-molded in the foam 180 while the second outer fabric layer 320 of the mesh 170 is free from the foam 180, e.g., not enveloped by the foam 180. In this embodiment, a first face 410 of the foam 180 envelops the mesh 170 while a second face 420 of the foam 180 defines a radial gap (or rim) 422 around the mesh 170 in the channel. In certain of these cases, optionally, the first outer fabric layer 310 is recessed relative to the first face 410. In further implementations, the second outer fabric layer 320 is approximately flush with the second face 420, or is recessed relative to the second face 420. In still further implementations, the second outer fabric layer 320 protrudes slightly (e.g., in the firing direction (FD)) relative to the second face 420. In certain implementations, the second outer fabric layer 320 is formed (e.g., cut) with a smaller outer diameter than the first outer fabric layer 310, such that when over-molded, the foam 180 envelops (or, grabs) the first outer fabric layer 310 without enveloping the second outer fabric layer 320, thereby leaving the radial gap 422.

Figure 7:
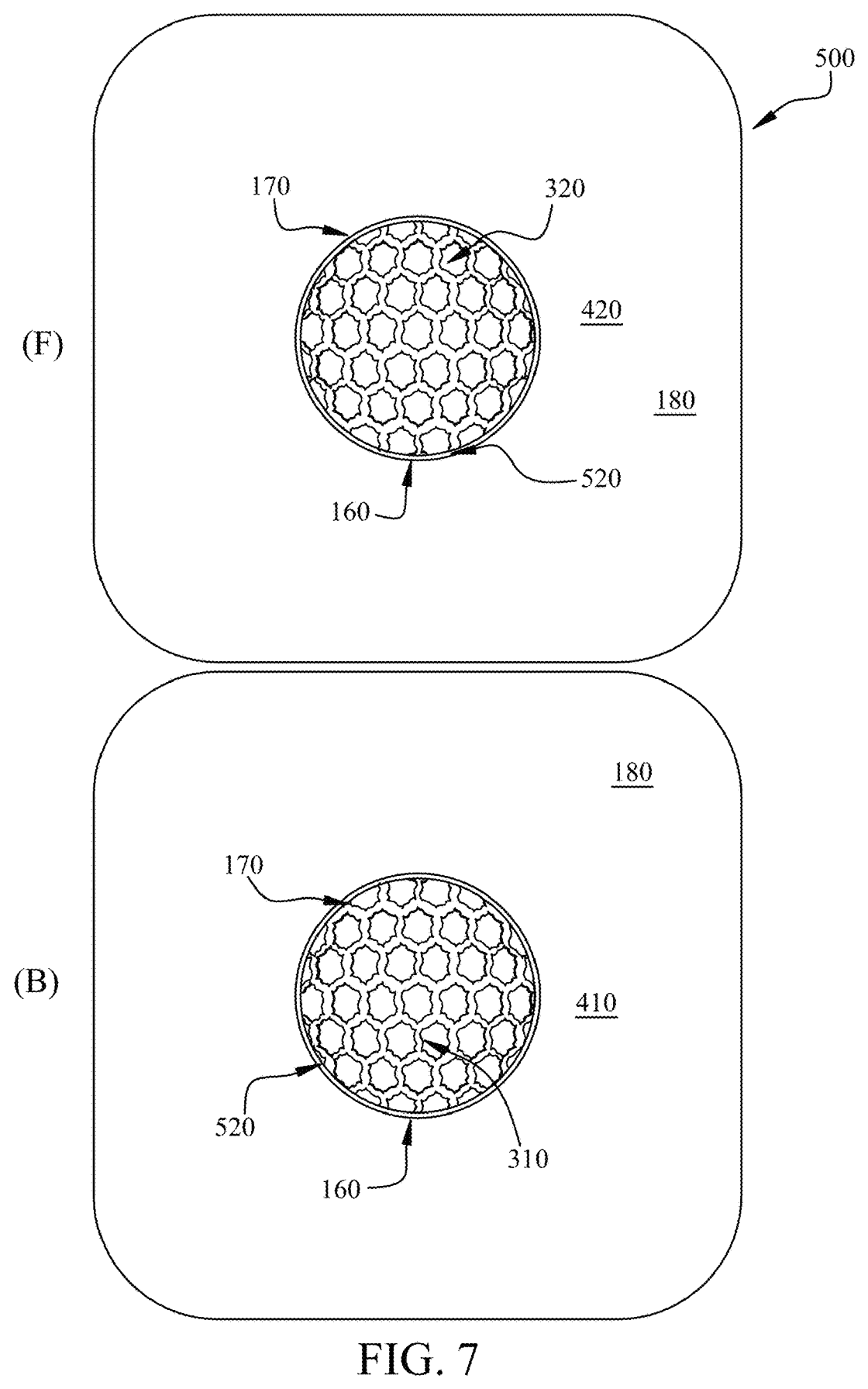
Figures 8, 9:
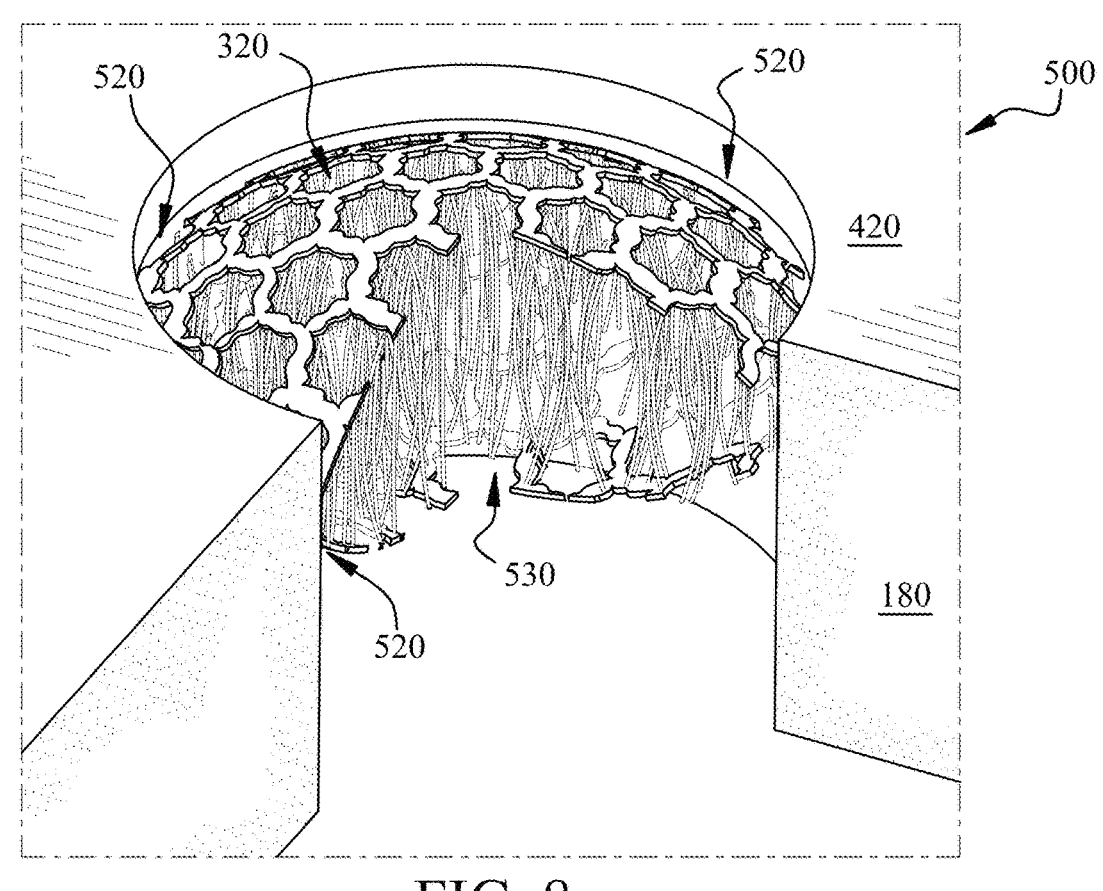
FIG. 8 shows a perspective view of the mesh and foam configuration in FIG. 7.
FIG. 9 shows a cross-sectional view of the mesh and foam configuration in FIG. 8.

In a second configuration 500 (FIGS. 7-9), the foam 180 is over-molded on mesh 170 such that both the first outer fabric layer 310 and second outer fabric layer 320 of the mesh 170 are enveloped by the foam 180. In certain of these cases, at least a portion of the front face (e.g., second outer fabric layer 320) of the mesh 170 is recessed relative to a front face 420 of the foam 180, and at least a portion of the rear face (e.g., first outer fabric layer 310) of the mesh 170 is recessed relative to a rear face 410 of the foam 180. In certain cases, the mesh 170 is pinched at one or more interfaces 520 with the foam 180 in the acoustic channel 160, e.g., such that the mesh 170 has a convex surface when viewed from one or both sides of the acoustic channel 160 (FIGS. 8 and 9). In other terms, the mesh 170 appears domed when viewed in cross-section (FIG. 9), e.g., with narrower sections at the interfaces 520 and a thicker section 530 at the center of the channel 160. In one or both configurations 400, 500, the mesh 170 can have at least portions (e.g., near the center of the acoustic channel 160) with a uniform thickness, e.g., across the acoustic channel 160.

Returning to FIGS. 1 and 2, in various implementations, the headrest 100 includes a pair of headrest speakers 145 on either side of the center line (CL) of the headrest 100. In certain of these cases, the center-to-center (C-C) spacing between the speakers 145 (i.e., between center of transducers 150) is between approximately 150 mm and approximately 300 mm. In some examples, the center-to-center (C-C) spacing is approximately 200 mm.

With continuing reference to FIGS. 1 and 2, in various implementations, the mesh 170 provides structural support for the acoustic channel 160 to resist puncture at the exit 165 of the channel 160. In particular examples, the mesh 170 provides sufficient structural support for the acoustic channel 160 such that a grille (e.g., grille 240a) is not needed, e.g., such that the cover 230 can directly overly the acoustic channel 160 and provide sufficient stiffness to resist compression or puncture by a user during normal usage. In some of these cases, an air gap exits between the cover 230 and the outer face of the mesh 170, e.g., an air gap of approximately 5-15 mm, and in particular cases, approximately 10 mm. In certain of these cases, and in contrast to conventional headrest speakers, the cover 230 is continuous across the front 140 of the headrest without interruption by a grille. Further, in certain cases, the exit 165 of the channel 160 can be directly overlaid with cover 230 without an intervening grille.

It is noted that in alternative embodiments, a grille 240a such as illustrated in FIG. 1 can be positioned between the mesh 170 and the cover 230. In such cases, the grille 240a can be retained by the foam 180, e.g., via over-molding as described herein. In a particular example, the grille 240a can include a rigid grille (e.g., an injection molded component such as an injection molded plastic) that is positioned adjacent to (e.g., next to or contacting) the mesh 170 during over-molding of the foam 180. In such cases, the foam 180 can be formed over the mesh 170 and the grille 240a in a single over-molding process.

In still further optional embodiments, as shown in FIG. 1, another grille 240b (additional to grille 240a, or alternatively to 240a) can be positioned between the transducer 150 and the mesh 170, e.g., over the exit of the transducer 150. Grille 240b is illustrated in dashed lines as optional in FIG. 1, and it is understood that either or both embodiments of the grille 240a,b can be integrated into any headrest speaker configuration disclosed herein. In certain cases grille 240b includes an at least partially compliant material, e.g., distinct from the rigid material of grille 240*a*. In other cases, grille 240*b* may be formed of a similar material as described with reference to grille 240*a*.

Figure 10:
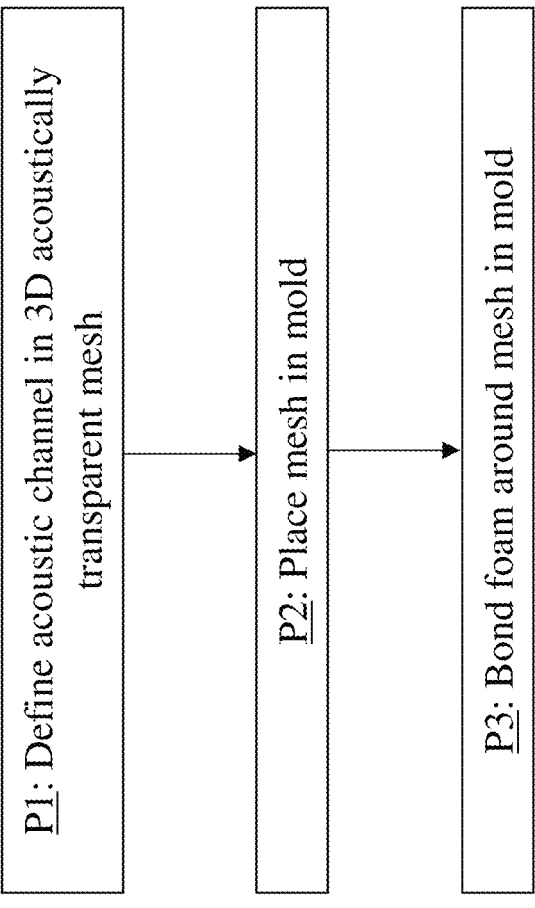
FIG. 10 is a flow diagram illustrating methods in a process according to various implementations.
Figure 11:
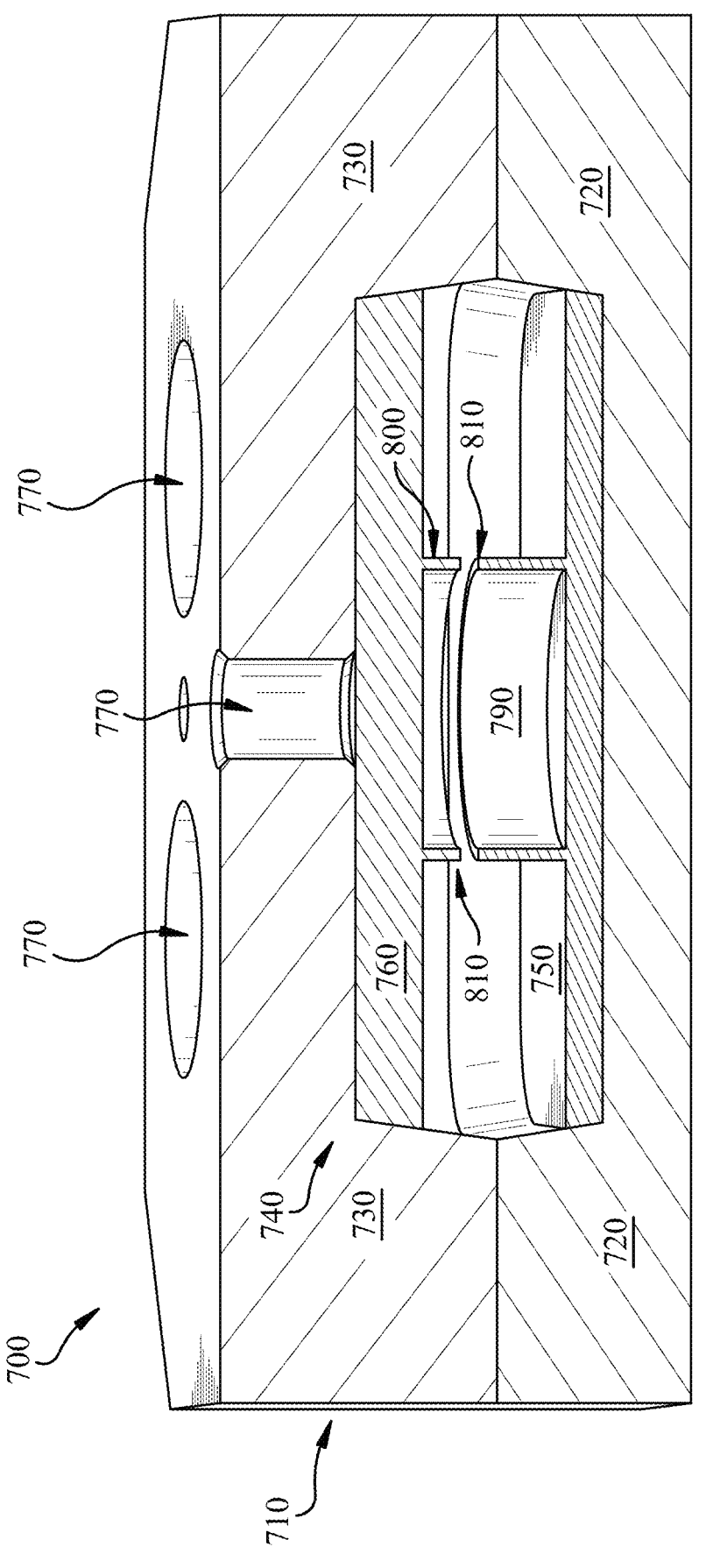
FIG. 11 is a cross-sectional perspective view of a tool for forming a foam over an acoustic mesh according to various implementations.

FIG. 10 is a flow diagram illustrating processes in a method of manufacturing a headrest speaker such as the speakers 145 in FIGS. 1 and 2. FIG. 10 is described in conjunction with the cross-sectional perspective view of an example apparatus 700 for forming the speakers 145 as depicted in FIG. 11. The apparatus 700 can include a tool holder 710 including a base (or, lower) section 720 and a cap (or, top) section 730. A mold (or, tool) 740 can include a mold bottom 750 and a mold top 760 for over-molding the foam 180 on the mesh 170. Returning to FIG. 10, in a first process (P1), the method includes defining the acoustic channel in the 3D acoustically transparent mesh. In various implementations, this includes cutting a shape in the mesh to align with the shape and size of the exit (e.g., outer diameter) of the transducer 150. In certain cases, the defining the acoustic channel in the 3D acoustically transparent mesh includes cutting a piece of spacer fabric 300 (FIG. 3) that is sized to align with the exit of the transducer 150. In certain cases, the mesh 170 is cut from the spacer fabric 300 via mechanical or laser cutting. In various implementations, an approximately circular shaped mesh 170 is cut from the spacer fabric 300 to approximately align with the size of the transducer 150, with a margin or buffer that enables pinching or retention by the mold 740. That is, the mesh 170 can be cut in an oversized circular shape (e.g., having a diameter corresponding with the diameter of the transducer 150 plus a margin) to enable retention in the mold 740 for bonding to the foam 180. It is understood that other shapes of mesh are possible, e.g., square, rectangular, or oblong shaped mesh, which can be cut with sufficient margin to enable retention in the corresponding mold.

In a second process (P2), the mesh 170 is placed in the mold 740 (FIG. 11). In certain cases, the mold 740 has an approximately circular shape, however as noted herein, the mesh 170 can be cut to fit any shaped mold. In certain cases, the mesh 170 is placed in the mold bottom 750, and the mold top 760 is placed over the mesh 170. In particular cases, the mold bottom 750 sits in the base section 720 when the mesh 170 is placed in the mold bottom 750, however, the mesh 170 and mold bottom 750 can be placed in the mold bottom 750 together. Once the mold top 760 is placed over the mesh 170 in the mold bottom 750, the cap section 730 is placed over the mold top 760. As shown in FIG. 11, the mold top 760 can include one or more input apertures 770 for flowing foam around the mesh 170. In certain cases, a plurality of input apertures 770 are located around the mold top 760 to enable even distribution of foam around the mesh 170 during over-molding.

In a third process (P3), foam 180 is bonded around mesh 170 in the mold 740. In these cases, a foam mix can be introduced (e.g., multiple parts are combined) to make it flowable, and the flowable mix can be injected into the mold 740 via the input apertures 770. Once introduced to the mold 740, the foam mix flows to fill chamber 780, bonds with the outside (e.g., outer diameter) of the mesh 170, and cures as foam 180. In certain cases, the mold bottom 750 and mold top 760 include walls 790, 800, respectively, that can pinch the outer dimension (or outer diameter) of the mesh 170 and enable the foam 180 to bond to that pinched portion of the mesh 170 prior to hardening. For example, as shown in FIG. 11, a gap 810 between the walls 790, 800 enables the foam 180 to bond to the mesh 170 at this limited interface without encroaching on the core portion of the mesh 170, e.g., maintaining an acoustically transparent channel. It is understood that different wall configurations are possible to enable bonding the foam 180 to the mesh 170, for example, different wall shapes and/or spacings.

In contrast to conventional systems and approaches, various aspects of the disclosure enable forming an acoustically transparent channel in a headrest speaker using an over-molded foam and a structurally supportive mesh. The approaches and resulting headrest speakers can improve the user experience, enhance esthetics, and/or reduce manufacturing costs. For example, a low profile or nominal profile speaker can be mounted in a headrest according to various implementations while maintaining desirable structural support. In further implementations, additional components such as a grille (e.g., rigid grille) can be over-molded in the headrest foam to provide further structural support for the acoustic channel.

The term "approximately" as used with respect to values herein can allot for a nominal variation from absolute values, e.g., of several percent or less. Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Where the term "comprising" is used in the present description and claims, it does not exclude other elements or operations. The term "based on" (as in "A is based on B") is used to indicate any of its ordinary meanings, including the cases (i) "based on at least" (e.g., "A is based on at least B") and, if appropriate in the particular context, (ii) "equal to" (e.g., "A is equal to B"). Similarly, the term "in response to" is used to indicate any of its ordinary meanings, including "in response to at least."

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Any incorporation by reference of a portion of a document shall also be understood to incorporate definitions of terms or variables that are referenced within the portion, where such definitions appear elsewhere in the document, as well as any figures referenced in the incorporated port Certain components in the disclosed systems may not be depicted, but are understood to enable various additional functions. For example, systems can include additional electronics including but not limited to power source(s), processors, memory, communications components such as transmitters/receivers, network connection equipment (including but not limited to: Wi-Fi, Bluetooth, cellular or near field communications (NFC) equipment) and location-identification components (e.g., GPS systems). Additionally, systems disclosed herein can include one or more interfaces allowing user interaction that includes one or more conventional inputs, such as haptic inputs including a dial, button, touch screen, etc. The interface can also include a voice command interface, such that the user can make adjustments using voice commands. The interface can also include a gesture-based interface, such that the user can make adjustments with gestures (e.g., hand wave, nodding, etc.).

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other implementations are within the scope of the following claims.

We claim:

1. A headrest speaker comprising:
an acoustic channel;
a three-dimensional (3D) acoustically transparent mesh in the acoustic channel; and
a foam retaining the acoustically transparent mesh in the acoustic channel,
wherein the foam is over-molded on the 3D acoustically transparent mesh.

2. The headrest speaker of claim 1, wherein the 3D acoustically transparent mesh defines a portion of the acoustic channel extending through the foam.

3. The headrest speaker of claim 1, wherein the 3D acoustically transparent mesh is pinched at an interface with the foam in the acoustic channel.

4. The headrest speaker of claim 1, wherein the 3D acoustically transparent mesh has a uniform thickness across the acoustic channel.

5. The headrest speaker of claim 1, wherein a front face of the 3D acoustically transparent mesh is approximately flush with a front face of the foam.

6. The headrest speaker of claim 1, wherein the 3D acoustically transparent mesh is entirely retained in the headrest speaker by the foam.

7. The headrest speaker of claim 1, wherein the 3D acoustically transparent mesh has a thickness of approximately 15 millimeters (mm) to approximately 35 mm, and wherein the foam is approximately 20 mm thick to approximately 50 mm thick.

8. The headrest speaker of claim 1, further comprising a fabric covering the foam.

9. The headrest speaker of claim 1, wherein the foam is acoustically opaque and includes at least one of a foam-in-place material or a urethane.

10. The headrest speaker of claim 1, wherein the 3D acoustically transparent mesh includes a spacer fabric.

11. The headrest speaker of claim 10, wherein the spacer fabric includes:
a first outer fabric layer,
a second outer fabric layer, and
a layer of pile threads connecting the first outer fabric layer and the second outer fabric layer.

12. The headrest speaker of claim 11, wherein the layer of pile threads separates the first outer fabric layer from the second outer fabric layer, and wherein the spacer fabric has greater mechanical resistance against compression in a first direction than against compression in a second, distinct direction.

13. The headrest speaker of claim 1, wherein the headrest speaker is one of a pair of headrest speakers on either side of a centerline of the headrest, and wherein a center-to-center spacing between the pair of headrest speakers is between approximately 150 millimeters and approximately 300 mm.

14. The headrest speaker of claim 1, wherein the acoustic channel has one of a forward firing angle relative to a front face of the headrest or an inward firing angle relative to a front face of the headrest.

15. The headrest speaker of claim 1, wherein the 3D acoustically transparent mesh provides structural support for the acoustic channel to resist puncture at an exit of the acoustic channel.

16. The headrest speaker of claim 1, further comprising a grille overlying the 3D acoustically transparent mesh in the acoustic channel, wherein the foam is over-molded on the grille such that the grille is retained in the acoustic channel by the foam.

17. A method of manufacturing the headrest speaker of claim 1, comprising:
defining the acoustic channel in the 3D acoustically transparent mesh;
placing the 3D acoustically transparent mesh in a mold; and
bonding the foam around the 3D acoustically transparent mesh in the mold.

18. The method of claim 17, wherein the acoustic channel is defined in the 3D acoustically transparent mesh by cutting, and wherein the foam is bonded to the 3D acoustically transparent mesh while maintaining the acoustic channel.

19. A vehicle comprising a vehicle seat, the vehicle seat including the headrest speaker of claim 1.

20. A headrest speaker comprising:
an acoustic channel;
a three-dimensional (3D) acoustically transparent mesh in the acoustic channel, wherein the 3D acoustically transparent mesh includes a spacer fabric; and
a foam retaining the acoustically transparent mesh in the acoustic channel.

21. The headrest speaker of claim 20, wherein the spacer fabric includes:
a first outer fabric layer,
a second outer fabric layer, and
a layer of pile threads connecting the first outer fabric layer and the second outer fabric layer,
wherein the layer of pile threads separates the first outer fabric layer from the second outer fabric layer, and wherein the spacer fabric has greater mechanical resistance against compression in a first direction than against compression in a second, distinct direction.

22. A headrest speaker comprising:

an acoustic channel;

a three-dimensional (3D) acoustically transparent mesh in the acoustic channel; and a foam retaining the acoustically transparent mesh in the acoustic channel, wherein the 3D acoustically transparent mesh: a) is pinched at an interface with the foam in the acoustic channel, or b) has a uniform thickness across the acoustic channel.

23. The headrest speaker of claim 22, wherein the 3D acoustically transparent mesh includes a spacer fabric.

\* \* \* \* \*